US007015474B2

(12) United States Patent
Martenson

(10) Patent No.: US 7,015,474 B2
(45) Date of Patent: Mar. 21, 2006

(54) SYSTEM AND METHOD FOR DETECTING AND CHARACTERIZING MEDIA

(75) Inventor: David D. Martenson, Oregon City, OR (US)

(73) Assignee: Xerox Corporation, Stamford, CT (US)

( * ) Notice: Subject to any disclaimer, the term of this patent is extended or adjusted under 35 U.S.C. 154(b) by 417 days.

(21) Appl. No.: 10/345,423

(22) Filed: Jan. 15, 2003

(65) Prior Publication Data

US 2004/0135087 A1 Jul. 15, 2004

(51) Int. Cl.
*G01J 5/02* (2006.01)

(52) U.S. Cl. ................................ 250/341.8; 250/341.1

(58) Field of Classification Search ............ 250/341.8, 250/341.1, 338.2
See application file for complete search history.

(56) References Cited

U.S. PATENT DOCUMENTS

| | | | | |
|---|---|---|---|---|
| 3,435,240 | A | 3/1969 | Brunton | |
| 3,684,890 | A | 8/1972 | Haynes et al. | |
| 4,617,580 | A | 10/1986 | Miyakawa | |
| 5,139,339 | A | 8/1992 | Courtney et al. | |
| 5,146,087 | A | 9/1992 | VanDusen | |
| 5,723,202 | A | 3/1998 | Mueller et al. | |
| 5,754,213 | A | 5/1998 | Whritenor | |
| 6,325,505 | B1 * | 12/2001 | Walker | 347/105 |
| 6,394,676 | B1 * | 5/2002 | Dresher | 400/703 |
| 6,557,965 | B1 * | 5/2003 | Walker et al. | 347/16 |
| 2005/0040348 | A1 * | 2/2005 | Soar | 250/559.11 |

OTHER PUBLICATIONS

Siemens Reflective Media Sensor, Applications Department, Opto Components Division, Oct. 30, 1998.
W. Bloechle, “Measuring Surface Roughness With An Optical Sensor,” *Sensors*, pp. 58 and 60 (1999).

* cited by examiner

*Primary Examiner*—Albert Gagliardi
(74) *Attorney, Agent, or Firm*—Nixon Peabody LLP

(57) ABSTRACT

A system for detecting and characterizing media includes a light source, at least two sensors, and a media identification system. The light source is positioned to emit at least a portion of an illumination light towards a media path for media. The sensors are positioned to capture at least specular light and transmitted light from the emitted illumination light directed towards the media path for the media. The media identification system characterizes the media based on the captured specular and transmitted light

23 Claims, 2 Drawing Sheets

SYSTEM AND METHOD FOR DETECTING AND CHARACTERIZING MEDIA

FIELD

This invention generally relates to sensing systems and methods and, more particularly, to a system and method for detecting and characterizing media in a printing device.

BACKGROUND

Printing devices, such as copiers and printers, are required today to print on a wide range of media. Typically, the types of media that consumers choose to print on range from classic white printer paper of different textures and weights, to semi-transparent paper, such as vellum paper, to overhead transparencies. Each of these types of media absorbs ink differently and requires the printer to adjust in order to maximize print quality.

Prior systems have included contact sensors to identify the presence of media, but these contact sensors can not classify the type of media. As a result, in these systems the operator must enter the type of media so that the printer can adjust the ink parameters.

Other systems, such as the one disclosed in U.S. Pat. No. 5,139,339 to Courtney et al. which is herein incorporated by reference in its entirety, utilize sensors to discriminate between paper and a transparency traveling in a paper path. Accordingly, this system can distinguish between media with very different characteristics.

SUMMARY

A system for detecting and characterizing media in accordance with embodiments of the present invention includes a light source, at least two sensors, and a media identification system. The light source is positioned to emit at least a portion of an illumination light towards a media path for media. The sensors are positioned to capture at least specular light and transmitted light from the emitted illumination light directed towards the media path for the media. The media identification system characterizes the media based on the captured specular and transmitted light.

A method for detecting and characterizing media in accordance with embodiments of the present invention includes emitting at least a portion of an illumination light towards a media path for media. At least specular light and transmitted light are captured from the emitted illumination light directed towards the media path for the media. The media is characterized based on the captured specular and transmitted light.

A system for detecting and characterizing media in accordance with embodiments of the present invention includes a light source, a specular sensor, a diffuse sensor, a transmission sensor, and a media identification system. The light source is positioned to emit at least a portion of an illumination light towards a media path for media. The specular sensor is positioned to capture specular light from the emitted illumination light directed towards the media path for the media. The diffuse sensor is positioned to capture diffuse light from the emitted illumination light directed towards the media path for the media. The transmission sensor is positioned to capture transmitted light from the emitted illumination light directed towards the media path for the media. The media identification system characterizes the media based on the captured specular, diffuse, and transmitted light.

A method for detecting and characterizing media in accordance with embodiments of the present invention includes emitting at least a portion of an illumination light towards a media path for media. The specular light is captured from the emitted illumination light directed towards the media path for the media. The diffuse light is captured from the emitted illumination light directed towards the media path for the media. The transmitted light is captured from the emitted illumination light directed towards the media path for the media. The media is characterized based on the captured specular, diffuse, and transmitted light The present invention can accurately characterize a wide range of media in a device that transports sheet media with differing transmissive and surface properties, even some different types of media which have some similar characteristics. As result, printing in these devices can be optimized because the printing device can automatically adjust printing parameters for the particular type of media being printed on. The present invention can also accurately detect one or more edges of the media over time with little, if any, degradation in performance over time.

DETAILED DESCRIPTION

Figure 1:
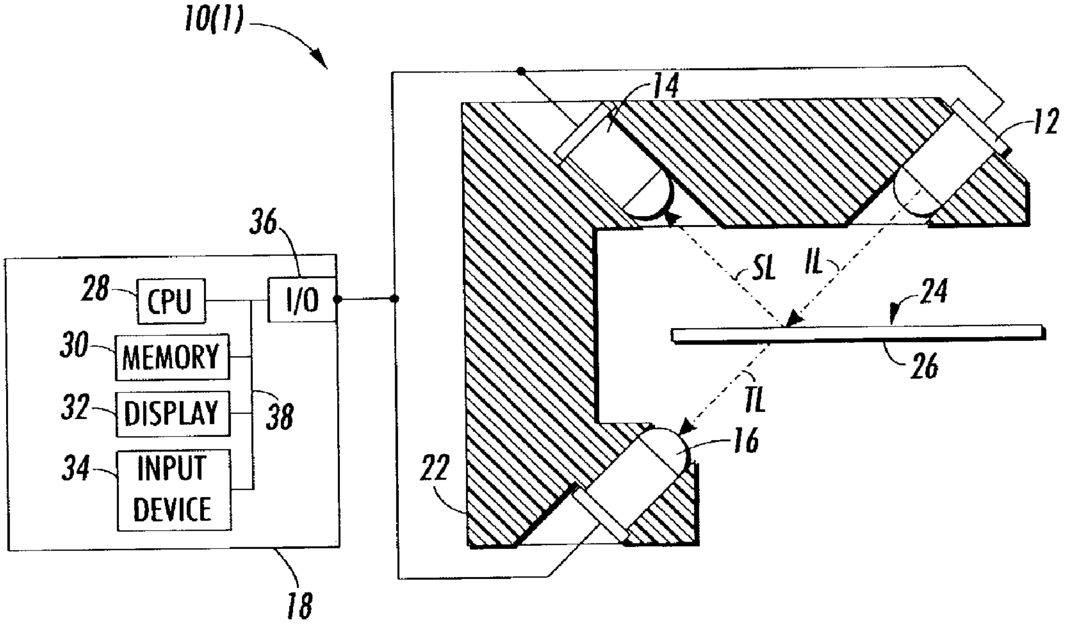
FIG. 1 is a block diagram of a system for detecting and characterizing media in accordance with embodiments of the present invention.

A system 10(1) for characterizing media in accordance with embodiments of the present invention is illustrated in FIG. 1. This system 10(1) includes an illumination source 12, a specular phototransistor 14, a transmission phototransistor 16, and a media identification system 18, although the system 10(1) can include other numbers and types of components, such as diffuse phototransistor 20 as shown in system 10(2) in FIG. 2. The present invention can accurately characterize a wide range of media in a printing device and can accurately detect one or more edges of the media over time with little, if any, degradation in performance over time.

Referring more specifically to FIG. 1, the system 10(1) is a printing device, such as printing or facsimile machine or a copier. The system 10(1) includes a housing 22 which has a media path 24 along which a media 26 is transported by a conveying system (not shown). A cross-sectional view of the media path 24 is shown in FIG. 1 so in this view the media path 24 extends along a direction which extends into and out of the page, although the media path 24 can extend along other directions. The housing 22 also includes the other components of the printing device. Since the other components of printing devices and their connections and operation are well known to those of ordinary skill in the art, they will not be described here.

An infrared light emitting diode (IRLED) illumination source 12 is located in the housing 22, although other types and numbers of illumination sources can be used. The illumination source 12 is positioned to emit or direct illumination towards any media 26 which may be in the media path 24. The illumination source 12 is positioned to direct the illumination at an angle with respect to the direction of the media path, although the illumination source 12 can be positioned at other angles.

An aperture or additional lens could be used in front of the illumination source 12 to narrow the illuminated spot size on the media 26 and/or the phototransistors 14, 16, and/or 20 could have apertures or additional lenses to narrow the width of the illumination light IL entering them thus improving edge detection. Additionally, to provide a small illumination spot, other types of illumination sources which output a narrow illumination light IL, such as a laser, could be used as the illumination source 12. The phototransistors 14, 16, and/or 20 could be photodiodes or other photosensitive devices. If ambient light interferes with the sensor operation, then the illumination source 12 could be modulated and the phototransistors 14, 16, and/or 20 synchronized with the illumination source 12.

A specular phototransistor 14 is located in the housing 22 and is on the same side of the media path 24 as the illumination source 12, although other types and numbers of sensors, as well as other locations for the specular phototransistor 14 can be used. The specular phototransistor 14 is positioned at an angle with respect to the direction of the media path 24 to capture any specular light SL reflected off of a surface of the media 26 which has been illuminated by illumination light IL from the illumination source 12, although the specular phototransistor 14 can be positioned at other angles. The angle at which the specular phototransistor 14 is positioned with respect to the media path 24 corresponds to the angle at which the illumination source 12 is positioned with respect to the media path 24, e.g. if the illumination source 12 is at 45 degrees the specular phototransistor 14 is at 135 degrees, although the specular phototransistor 14 can be positioned at other angles. The threshold and gains of the specular phototransistor 14 are adjusted so that the specular phototransistor 14 with transmission phototransistor 16 can reliably characterize media 26 in the media path.

Referring back to FIG. 1, a transmission phototransistor 16 is located in the housing 22 and is on an opposing side of the media path 24 from the illumination source 12, although other types and numbers of sensors, as well as other locations for the transmission phototransistor 16 can be used. The transmission phototransistor 16 is positioned at an angle with respect to the direction of the media path 24 and substantially opposite from the illumination source 26 to capture any transmitted light TL which passes through the media 26 which has been illuminated by illumination light IL from the illumination source 12, although the transmission phototransistor 16 can be positioned at other angles. The threshold and gains of the transmission phototransistor 16 are adjusted so that the transmission phototransistor 16 with the specular phototransistor 14 can reliably characterize media 26 in the media path.

The media identification system 18 includes a processor 28, a memory storage device 30, a display 32, a user input device 34, and an input/output (I/O) unit 36 which are coupled together by a bus system 38 or other link, respectively, although the media identification system 18 may comprise other components, other numbers of the components, and other combinations of the components.

The processor 28 may execute one or more programs of stored instructions for the method for detecting and characterizing media in accordance with embodiments of the present invention as described herein. In this particular embodiment, programmed instructions for detecting and characterizing media are stored in memory 30 and are executed by processor 28, although some or all of those programmed instructions could be stored and retrieved from and also executed at other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 28, can be used for memory 30.

The display or graphical user interface 32 is used to show information to the operator, such as the type of media 26 in the printing system 10(1). A variety of different of devices can be used for the display 32, such as a CRT or flat panel display.

The user input device 34 permits an operator to enter data into the in media identification system 18. A variety of different types devices can be used for user input device 34, such as a keyboard, a computer mouse, or an interactive display screen.

The I/O unit 36 in media identification system 18 is used to couple the media identification system 18 to the illumination source 12, specular phototransistor 14, and the transmission phototransistor 16, although the I/O unit 36 can couple the media identification system 18 to other components. A variety of different interface devices can be used with a variety of different communication protocols.

Although one media identification system 18 is shown, other types of media identification systems can be used. For example, the media identification system 18 could be as simple as sensor signal threshold detectors that can be adjusted or calibrated for optimum operation and logic or as complex as a programmable microcontroller or microprocessor with analog to digital converters the components and operation of which are well known to those of ordinary skill in the art and thus will not be described here.

Figure 2:
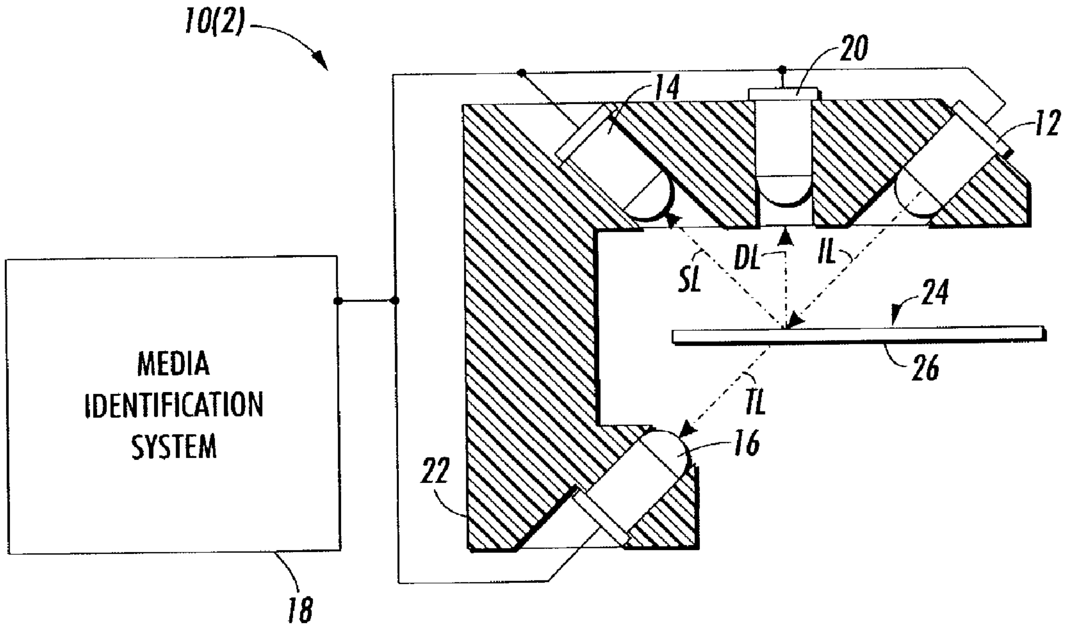
FIG. 2 is a block diagram of another system for detecting and characterizing media in accordance with embodiments of the present invention.

Referring to FIG. 2, another system 10(1) for characterizing media in accordance with embodiments of the present invention is illustrated. Elements in the system 10(2) in FIG. 2 which correspond to elements in the system 10(1) in FIG. 2 have like numbers and will not be described again in detail here.

System 10(2) also includes a diffuse phototransistor 20 which is located in the housing 22 and is on the same side of the media path 24 as the illumination source 12, although other types and numbers of sensors, as well as other locations for the diffuse phototransistor 20 can be used. The diffuse phototransistor 20 is positioned substantially above direction of the media path 24 to capture any diffuse light DL coming off of a surface of the media 26 which has been illuminated by illumination light IL from the illumination source 12, although the diffuse phototransistor can be positioned at other angles. The diffuse phototransistor 20 is coupled to the I/O unit 36 for the media identification system 18. The threshold and gains of the diffuse phototransistor 20 are adjusted so that the diffuse phototransistor 20 with specular and transmission phototransistors 14 and 16 can reliably characterize media 26 in the media path.

The operation of systems 10(1) and 10(2) is based on sensing properties of the media 26, such as specular light, diffuse light, and transmitted light, when illumination light IL is emitted towards the media 26, although other types of properties can be sensed. Specular light or gloss refers to the percentage of light energy received on a specular reflected axis (at specified incident angle) vs. illumination light energy transmitted at the media. Diffuse light or haze refers to the percentage of light energy transmitted off-axis vs. illumination light energy transmitted at the media (incident energy normal to the media). Transmitted light or opacity refers to the percentage of light energy transmitted through the media vs. light energy transmitted at the media.

Figure 3:
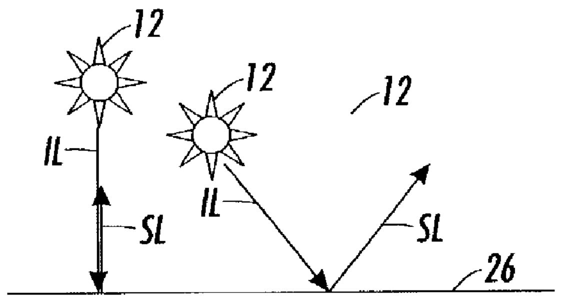
FIG. 3 is a diagram of specular light from a surface illuminated by light sources at two different angles.

Surfaces of various media 26 may range from a very smooth surface, such as that of an overhead transparency, to a very rough surface, such as that of a low-gloss paper. When illumination light IL from a light source 12 hits a perfectly smooth surface, a high percentage of the illumination light IL will be reflected at an angle equal to the angle of incidence. This form of light is called specular radiation or light. SL. A couple of examples of specular light SL reflected off of a surface of the media 26 which has been illuminated by illumination light IL from the illumination source 12 positioned at different angles are illustrated in FIG. 3.

Figure 4:
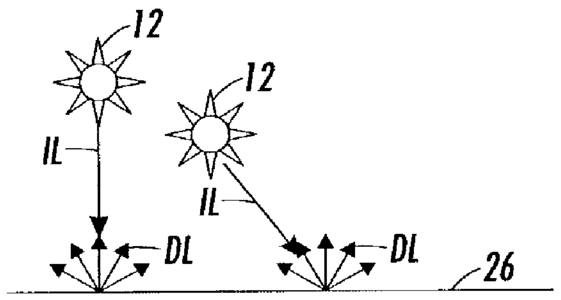
FIG. 4 is a diagram of diffuse light from a surface illuminated by light sources at two different angles.

When illumination light IL from a light source 12 hits a surface of the media 26 which is perfectly rough, a high percentage of the illumination light IL will scatter in all directions. This form of light is called diffuse radiation light DL. A couple of examples of diffuse light DL coming off of a surface of the media 26 which has been illuminated by illumination light IL from the illumination source 12 positioned at different angles are illustrated in FIG. 4

Figure 5:
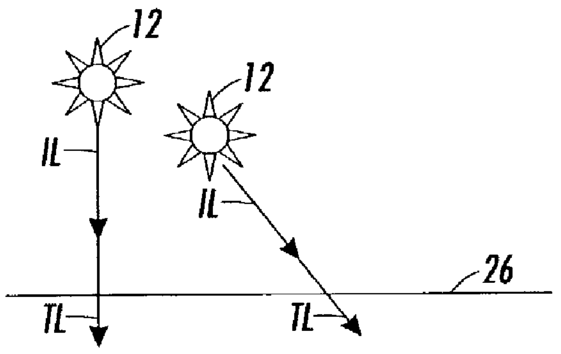
FIG. 5 are diagram of transmitted light from a surface illuminated by light sources at two different angles.

When illumination light IL from a light source 12 hits a surface of the media 26 which is perfectly transparent, a high percentage of the illumination light IL will pass through the media 26. This form of light is called diffuse transmitted light TL. A couple of examples of transmitted light TL passing through the media 26 which has been illuminated by illumination light IL from the illumination source 12 positioned at different angles are illustrated in FIG. 5.

In reality, no surface of a media 26 is either perfectly smooth, perfectly rough, or perfectly transparent. The smoothness, roughness, and transparency of any particular surface lies on a continuum between these properties. By obtaining measurements of these properties and then comparing the results against tables stored in memory 30 of media 26 with similar properties, the particular media 26 can be characterized and printing operations can be optimized for that media 26.

The operation of the system 10(1) for detecting and characterizing media in system 10(1) accordance with embodiments of the present invention will now be described with reference to FIG. 1. When the system 10(1) receives a job, media 26 is fed along the media path 26 in the housing 22. The media identification system 18 signals the illumination source 12 to illuminate the media 26 in the media path 24 with illumination light IL, although other ways of engaging the illumination source 12 to emit illumination light towards the media path 24 can be used. The illumination light IL is selected to have a wavelength which can be sensed by specular phototransistor 14 and transmission phototransistor 16. Infrared illumination light is used, although other types of illumination light can be used.

The illumination light 12 strikes a surface of the media 26 and, depending on the particular type of media 26 in the path, a portion of the illumination light IL may be reflected as specular light SL and another portion of the illumination light may be transmitted through the media 26 and comes out as transmitted light TL. The specular phototransistor 14 captures specular light SL reflected from the media, converts the specular light SL to an electrical signal representative of the amount of specular light captured, and sends this electrical signal to the media identification system 18. The transmission phototransistor 16 captures transmitted light TL which is transmitted though the media, converts the transmitted light TL to an electrical signal representative of the amount of transmitted light captured, and sends this electrical signal to the media identification system 18.

The media identification system 18 receives the signals representative of the captured specular light SL and the captured transmitted light TL. The media identification system 18 can compare these signals against values stored in memory 30 for properties of other types of media 26 and can characterize the media 26 based on the closest match, although other techniques for characterizing the media based on these signals can be used. By way of example only, a simplified table which can be stored in memory 30 of media identification system 18 showing the states of each of the two phototransistors or sensors 14 and 16 for various types of media 26 is as follows:

| Media | Specular Sensor | Transmission Sensor |
|---|---|---|
| No Media | Low | High |
| Paper | Low | Low |
| Vellum | High | Low |
| Glossy Paper | High | Low |
| Overhead Transparency | High | High |

Although the table above is fairly simple, larger tables with greater detail regarding the amount of specular and transmitted light captured can be used, such as a table which may have different values for captured specular and transmitted light for different types of paper, can be used to provide a more precise characterization of the particular media 26. Based on the characterization of the media 26, the system 10(1) has stored instructions for adjusting the printing parameters to optimize printing on particular media 26 being used.

For example, if the media 26 in the media path 24 is paper with a rough surface, then only a small portion of the illumination light IL will be reflected off the media 26 and be captured by the specular phototransistor 14 as specular light and only a small portion of the illumination light IL will pass through the media 26 and be captured by the transmission phototransistor 16 as transmitted light TL. Accordingly, based on these particular signals from the specular and transmission phototransistors 14 and 16, the media identification system 18 will characterize the media as a paper. Depending on the amount of captured specular light SL and transmitted light TL, the media identification system 18 can characterize or identify the particular type of paper.

The captured signals for the specular and/or transmitted light Sl and TL can also be used by the media identification system 18 to detect an edge or edges of the media 26. When the illumination light IL strikes the media path 24 prior to any media 26 in the system 10(1), the captured specular and transmitted light SL and TL will have certain values. When the illumination light IL first strikes the media 26, the amount of specular and transmitted light SL and TL will change indicating an edge of the media 26. The first time one or more of these values change indicates the presence of an edge of the media 26, although other techniques for detecting an edge of the media 26 using these signals can be used.

The operation of the system 10(2) for detecting and characterizing media in system 10(2) accordance with embodiments of the present invention will now be described with reference to FIG. 2. This operation is the same as the operation described above except as described below.

When the illumination light 12 strikes the surface of the media 26, in addition to specular light SL and transmitted light TL, a portion of the illumination light IL may also be reflected as diffuse light DL. The diffuse phototransistor 20 captures diffuse light DL reflected from the media, converts the diffuse light DL to an electrical signal representative of the diffuse light captured, and sends this electrical signal to the media identification system 18.

The media identification system 18 receives the signals representative of the captured specular light SL, diffuse light DL, and the captured transmitted light TL. The media identification system 18 can compare these signals against preset threshold values or values stored in memory 30 for properties of other types of media 26 and can characterize the media 26 based on the closest match, although other techniques for characterizing the media based on these signals can be used. Consideration of the amount of diffuse light DL captured by diffuse phototransistor 20 with the amount of specular light SL and transmitted light TL provides additional information about the media 26 which enables an even more precise characterization of the particular type of media 26 being used. By way of example only, another simplified table which can be stored in memory 30 of media identification system 18 showing the states of each of the three phototransistors or sensors 14, 16, and 20 for various types of media 26 is as follows:

| Media | Specular Sensor | Diffuse Sensor | Transmission Sensor |
|---|---|---|---|
| No Media | High | Low | High |
| Paper | Low | Low | Low |
| Vellum | High | High | Low |
| Glossy | High | Low | Low |
| Overhead Transparency | High | High | High |

Although the table above is still fairly simple, larger tables with greater detail regarding the amount of specular, diffuse, and transmitted light captured can be used, such as a table which may have different values for captured specular, diffuse, and transmitted light for different types of paper, can be used to provide a more precise characterization of the particular media 26. Based on the characterization of the media 26, the system 10(1) has stored instructions for adjusting the printing parameters to optimize printing on particular media 26 being used. The system 10(2) with an illumination source 12 and specular, transmission, and diffuse phototransistors 14, 16, and 20 provides more information to the identification system 18, then system 10(1) and thus has even better media discrimination ability.

The captured signals for the specular, diffuse and/or transmitted light SL, DL, and TL can also be used by the media identification system 18 to detect an edge or edges of the media 26. When the illumination light IL strikes the media path 24 prior to any media 26 in the system 10(1), the captured specular, diffuse, and transmitted light SL, DL, and TL will have certain values. When the illumination light IL first strikes the media 26, the amount of specular, diffuse, and transmitted light SL, DL, and TL will change indicating an edge of the media 26. The first time one or more of these values change indicates the presence of an edge of the media 26, although other techniques for detecting an edge of the media 26 using these signals can be used.

Accordingly, with the present invention printing devices, such as printers, facsimile machines, and copiers, can automatically adjust printing parameters to a wide variety of media to provide consistent and exceptional printing quality. The types of media which can be characterized with the present invention include classic printer paper of different textures and weights, semi-transparent paper such as vellum paper, and overhead transparencies. Additionally, with the inputs from the specular and transmission phototransistors or from the specular, diffuse, and transmission phototransistors, the systems 10(1) and 10(2) can detect one or more edges of the media with little, if any, degradation in performance over time.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefore, is not intended to limit the claimed processes to any order except as may be specified in the claims

What is claimed is:

1. A system comprising:

a light source positioned to emit at least a portion of an illumination light towards a media path for media;

at least two sensors positioned to capture at least specular light and transmitted light from the emitted illumination light directed towards the media path for the media; and a media identification system that characterizes the media based on the captured specular and transmitted light.

2. The system as set forth in claim 1 wherein the at least two sensors comprise a specular sensor and a transmission sensor.

3. The system as set forth in claim 1 wherein the identification system detects an edge of the media based on at least one of the captured specular and transmitted light.

4. The system as set forth in claim 1 further comprising a diffuse sensor positioned to capture diffuse light from the emitted illumination light directed towards the media path.

5. The system as set forth in claim 4 wherein the identification system that characterizes the media based on the captured specular, transmitted, and diffuse light.

6. The system as set forth in claim 4 wherein the identification system detects an edge of the media based on at least one of the captured specular, transmitted, and diffuse light.

7. The system as set forth in claim 1 wherein the illumination light is an infrared light.

8. The system as set forth in claim 1 wherein the light source further comprises a modulator that modulates the illumination light, the at least two sensors are synchronized with the modulated illumination light.

9. A method comprising:

emitting at least a portion of an illumination light towards a media path for media;

capturing at least specular light and transmitted light from the emitted illumination light directed towards the media path for the media; and characterizing the media based on the captured specular and transmitted light.

10. The method as set forth in claim 9 further comprising detecting an edge of the media based on at least one of the captured specular and transmitted light.

11. The method as set forth in claim 9 further comprising capturing diffuse light from the emitted illumination light directed towards the media path.

12. The method as set forth in claim 11 wherein the characterizing the media further comprises characterizing the media based on the captured specular, transmitted, and diffuse light.

13. The method as set forth in claim 11 further comprising detecting an edge of the media based on at least one of the captured specular, transmitted, and diffuse light.

14. The method as set forth in claim 9 wherein the illumination light is an infrared light.

15. The method as set forth in claim 9 further comprising modulating the illumination light and synchronizing the capturing of the specular and transmitted light with the modulated illumination light.

16. A system comprising:

a light source positioned to emit at least a portion of an illumination light towards a media path for media;

a specular sensor positioned to capture specular light from the emitted illumination light directed towards the media path for the media;

a diffuse sensor positioned to capture diffuse light from the emitted illumination light directed towards the media path for the media;

a transmission sensor positioned to capture transmitted light from the emitted illumination light directed towards the media path for the media; and a media identification system that characterizes the media based on the captured specular, diffuse, and transmitted light.

17. The system as set forth in claim 16 wherein the identification system detects an edge of the media based on at least one of the captured specular, diffuse, and transmitted light.

18. The system as set forth in claim 16 wherein the illumination light is an infrared light.

19. The system as set forth in claim 16 wherein the light source further comprises a modulator that modulates the illumination light, the at least two sensors are synchronized with the modulated illumination light.

20. A method comprising:

emitting at least a portion of an illumination light towards a media path for media;

capturing specular light from the emitted illumination light directed towards the media path for the media;

capturing diffuse light from the emitted illumination light directed towards the media path for the media;

capturing transmitted light from the emitted illumination light directed towards the media path for the media; and characterizing the media based on the captured specular, diffuse, and transmitted light.

21. The method as set forth in claim 20 further comprising detecting an edge of the media based on at least one of the captured specular, diffuse, and transmitted light.

22. The method as set forth in claim 20 wherein the illumination light is an infrared light.

23. The method as set forth in claim 20 further comprising modulating the illumination light and synchronizing the capturing of the specular, diffuse, and transmitted light with the modulated illumination light.

* * * * *